(12) United States Patent
Hojjatie et al.

(10) Patent No.: US 7,686,963 B2
(45) Date of Patent: Mar. 30, 2010

(54) MAGNESIUM THIOSULFATE AS OZONE QUENCHER AND SCRUBBER

(75) Inventors: Michael Hojjatie, Tucson, AZ (US); Dean Abrams, Tucson, AZ (US)

(73) Assignee: Tessenderlo Kerley, Inc., Phoenix, AZ (US)

(*) Notice: Subject to any disclaimer, the term of this patent is extended or adjusted under 35 U.S.C. 154(b) by 1334 days.

(21) Appl. No.: 10/988,632

(22) Filed: Nov. 16, 2004

(65) Prior Publication Data

US 2006/0104876 A1    May 18, 2006

(51) Int. Cl.
*C02F 1/70* (2006.01)
*B01D 53/66* (2006.01)
*B01D 59/26* (2006.01)
*B01D 47/00* (2006.01)
*C01F 5/40* (2006.01)

(52) U.S. Cl. .................. 210/757; 96/108; 423/219; 423/241; 423/554

(58) Field of Classification Search .......... 423/210, 423/219, 514, 554, 241; 210/749, 757; 96/108
See application file for complete search history.

(56) References Cited

U.S. PATENT DOCUMENTS

| | | | |
|---|---|---|---|
| 3,865,794 A | 2/1975 | Scoggins et al. | |
| 4,038,297 A * | 7/1977 | Rodenberg et al. | 554/133 |
| 4,300,941 A | 11/1981 | Nakama | |
| 4,499,078 A | 2/1985 | Rivici | |
| 4,695,583 A | 9/1987 | Revici | |
| 4,756,909 A | 7/1988 | Revici | |
| 5,096,721 A | 3/1992 | Levy | |
| 5,192,571 A | 3/1993 | Levy | |
| 5,431,776 A | 7/1995 | Richardson et al. | |
| 5,514,644 A | 5/1996 | Dobson | |
| 5,562,941 A | 10/1996 | Levy | |
| 6,921,523 B2 | 7/2005 | Hojjatie et al. | |

(Continued)

FOREIGN PATENT DOCUMENTS

CA    1282339    4/1991

(Continued)

OTHER PUBLICATIONS

Helmig, "Ozone Removal Techniques in the Sampling of Atmospheric Volatile Organic Trace Gases," 1997, Atmospheric Environment, vol. 21, No. 21, pp. 3635-3651.*

(Continued)

*Primary Examiner*—Wayne Langel
*Assistant Examiner*—Brittany M Martinez
(74) *Attorney, Agent, or Firm*—Fennemore Craig, P.C.

(57) ABSTRACT

In one aspect, ozone is quenched from a water stream, such as a drinking water or wastewater stream being treated with ozone, by contacting the stream with magnesium thiosulfate. In another aspect, a method of scrubbing ozone from a gaseous stream comprises contacting the gaseous stream with magnesium thiosulfate. In an alternative embodiment, chlorine is quenched from a water stream by contacting the stream with magnesium thiosulfate or potassium thiosulfate. In yet another aspect, a method of scrubbing chlorine from a gaseous stream comprises contacting the stream with magnesium thiosulfate or potassium thiosulfate. In another embodiment, a thiosulfate, such as magnesium thiosulfate, calcium thiosulfate, potassium thiosulfate, or sodium thiosulfate, is provided on an air filter for scrubbing ozone or chlorine from gaseous streams.

13 Claims, 7 Drawing Sheets

U.S. PATENT DOCUMENTS 6,974,545 B1    12/2005   Holbrook

FOREIGN PATENT DOCUMENTS

| DE | 2364170    | 7/1974 |
| EP | 0491103 B1 | 3/1996 |
| GB | 1434779    | 5/1976 |
| GB | 2194885 A  | 3/1988 |

OTHER PUBLICATIONS

U.S. Appl. No. 10/682,863, filed Oct. 14, 2003, Hojjatie et al.

Piezoelectric Crystal Detection of Hydrogen Chloride via Sulfur Dioxide/Mercury Displacement; Hahn, E.C., et al; Analytical Letters; vol. 22; pp. 213-224; 1989.

Richey, Don, et al., "Improved Ozone Quenching with Calcium Thiosulfate," 15$^{th}$ Ozone World Congress Medical Conference, London, Sep. 2001, Sessions 17-18.

Hardison, Roy L., Small Drinking Water and Wastewater Systems Conference, Jan. 12-15, 2000, Phoenix, Arizona.

* cited by examiner

MAGNESIUM THIOSULFATE AS OZONE QUENCHER AND SCRUBBER

FIELD OF THE INVENTION

The present invention is directed to methods of using magnesium thiosulfate for ozone and chlorine quenching, e.g., in drinking water and wastewater treatment, as well as its use in scrubbing ozone and chlorine from gaseous streams.

DESCRIPTION OF RELATED ART

The thiosulfate ion, $S_2O_3^{2-}$, is a structural analogue of the $SO_4^{2-}$ ion in which one oxygen atom is replaced by one S atom. However, the two sulfur atoms in $S_2O_3^{-2}$ are not equivalent. One of the S atoms is a sulfide-like sulfur atom that gives the thiosulfate its reducing properties and complexing abilities.

Thiosulfates are used in a variety of applications, such as leather tanning, paper and textile manufacturing, flue-gas desulfurization, cement additives, dechlorination, hydrogen peroxide quenching, coating stabilizers, etc. Due to the complex-forming abilities with metals, thiosulfate compounds have been used in commercial applications such as photography, waste treatment and water treatment applications. Thiosulfates readily oxidize to dithionate, then tetrathionate and finally to sulfates:

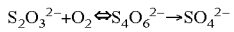

Magnesium thiosulfate is a liquid source of magnesium with concentrations up to about 32% attainable.

Industrial and waste treatment applications include the reduction of mercurous ion to free mercury, during which $MgS_2O_3$ is first reacted with hydrogen chloride to generate $SO_2$. See Piezoelectric Crystal Detection of Hydrogen Chloride via Sulfur Dioxide/Mercury Displacement; Hahn, E. C., et al; Analytical Letters; Vol. 22; p 213-224; 1989. Another example of an industrial application is catalysis for polyolefin manufacture. See German Patent 2364170 to Galliverti et al. (1974), Catalysts for Polyolefin Manufacture. Other examples of industrial applications include stabilization of copper (I) state in copper etchant solutions additives, as described in U.S. Pat. No. 5,431,776 to Richardson et al., Copper Etchant Solution Additives, and use of magnesium thiosulfate as a raw material for the synthesis of arylene sulfide polymers, as disclosed in U.S. Pat. No. 3,865,794 to Scoggins et al., Arylene Sulfide Polymers.

Pharmaceutical applications of magnesium thiosulfate include its use in conjunction with sodium chloride as neoplasm inhibitors/antagonist, as well as its use with vanadium in treating arteriosclerosis. See Canadian Patent 1,282,339 to Revici, Sodium Chloride Antagonist Compositions, Especially for use in Tumor Inhibition; and UK Patent 2,194,885 to Kaplan. Pharmaceutical applications of magnesium thiosulfate also include its use in conjunction with organomagnesium derivatives to treat viral diseases and immune system deficiencies, as described in EP 00491103 to Lanrranaga et al. (1996), Compositions for Therapeutic Use Comprising Organomagnesium Derivatives. Magnesium thiosulfate also has been used as an analgesic, as disclosed in U.S. Pat. No. 4,756,909 to Revici, Method for Relieving Pain or Producing Analgesic with N-butanol; and U.S. Pat. No. 4,695,583 to Revici, Methods for Relieving Pain or Producing Analgesic.

Agricultural applications of magnesium thiosulfate include its use in the acceleration of crop maturation, as described in U.S. Pat. No. 4,300,941 to Nakama, Agent and Method for Accelerating the Maturation of Field and Garden Crops.

Food manufacturing applications include use of magnesium thiosulfate as a substitute for sodium chloride salt. See U.S. Pat. No. 4,499,078 to Rivici, Counteracting the Deleterious Effects of Sodium Chloride. Magnesium thiosulfate also has been used for reduction of bitterness (e.g. due to chlorines, chloramines, alkaloids and phenols) in beverages. See U.S. Pat. No. 5,562,941 to Levy, Process for Improving the Taste of Beverages by Reducing Bitterness; and U.S. Pat. No. 5,096,721 to Levy, Process for Making an Aqueous Beverage and Removing Chlorine Therefrom. Other food manufacturing applications include dechlorination of city water, e.g., for use in beverage manufacture. See U.S. Pat. No. 5,192,571 to Levy, Process for Effecting the Dechlorination of Tap Water Added to Beverages. Magnesium thiosulfate also has been used as an additive for increasing the thermal stability of aqueous polysaccharide-containing fluids, as disclosed in U.S. Pat. No. 5,514,644 to Dobson, Polysaccharide Containing Fluids Having Enhanced Thermal Stability.

A process for preparing magnesium thiosulfate using MgO, sulfur, and sulfur dioxide as starting materials and based on the following reaction pathways is described in co-pending application Ser. No. 10/682,863, filed by Tessenderlo Kerley, Inc., Phoenix, Ariz., assignee of the subject application:

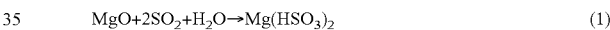 (1)

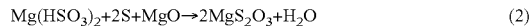 (2)

Ozone has become a common agent for disinfecting drinking water in municipal facilities. Ozone has been used for many years for this purpose as a powerful disinfectant and oxidant. Ozone is being used in treatment of drinking water and wastewater due to its multifaceted properties. Ozone controls water odor, taste, and color, as well as the presence of biological active species in water (GLI, International Application Note No. AN-OZ1, Rev. 0-101).

Unpleasant "musty" and "fishy" tastes and colors in treated water were eliminated when ozone was used to treat Milwaukee water (Milwaukee Water Works, Milwaukee Health Department New Bulletin).

Ozone is gradually replacing chlorine in the treatment of drinking water. Several municipalities, including the city of Milwaukee and three water treatment facilities in Nevada, have switched to the use of ozone for water treatment. Chlorine can generate hazardous components known as trihalomethanes, which are human carcinogens. In addition, chlorine can cause objectionable odors in water.

Ozone is very reactive and decays rapidly in water. In general, an ozone disinfection system is built on the bases of "net ozone demand" that includes efficiency of the ozone transfer plus the actual amount of the required ozone for disinfection. This usually requires an excess of ozone that needs to be removed through ozone quenching. The ozone quenching system should be able to reduce the remaining dissolved ozone to almost non-detectable levels. Quenching of excess ozone in water, after a proper contact time, can be achieved chemically or photochemically.

Photochemical degradation of excess ozone in water has been achieved by utilization of ultraviolet light. In addition to problems associated with the use of UV generators, ultra violet light can be harmful to human.

Typically an ozone quenching agent is added to the system in order to eliminate excess ozone. In addition to being efficient, these agents should not have any adverse effects, chemically or physically to the water, such as change in color, taste, or being hazardous.

Several quenching agents, including hydrogen peroxide ($H_2O_2$), sodium metabisulfite ($Na_2S_2O_5$), sodium bisulfite ($NaHSO_3$), calcium thiosulfate ($CaS_2O_3$), and sodium thiosulfate ($NaS_2O_3$), have been used for ozone quenching purposes. Calcium thiosulfate has been used as ozone quencher in drinking water (Don Richey, et al., in Improved Ozone Quenching with Calcium Thiosulfate, 15th Ozone World Congress Medical Therapy Conference, London; September 2001; Sessions 17-18), (Roy L. Hardison, Small Drinking Water and Wastewater Systems Conference, Jan. 12-15, 2000, Phoenix, Ariz.), as well as in dechlorination of drinking water and wastewater processes. Each of these agents usually is used in a mole ratio (relative to ozone) of 1:1. Although each of these agents is generally efficient as an ozone quencher, each has certain drawbacks.

Hydrogen peroxide in concentrated form is hazardous and difficult to handle. Care needs to be taken when diluting concentrated hydrogen peroxide. In addition, its rate of ozone quenching at low temperatures is relatively slow.

The use of sodium metabisulfite or sodium bisulfite for ozone quenching potentially can release $SO_2$ gas to the environment. In addition, these components are difficult to handle and may introduce dissolved solids into the system. For example, calcium sulfate is a product of ozone quenching when calcium thiosulfate is used. Calcium sulfate has a very low water solubility (about 0.3 g/100 ml) and therefore may precipitate in the system. Calcium sulfate can form deposits in the treatment facility equipment and in pipelines. In addition to being relatively expensive, the use of sodium thiosulfate can be undesirable because of the possible increase in the sodium content of the water stream.

SUMMARY OF THE INVENTION

The present invention, according to one aspect, is directed to a method of quenching ozone from a water stream, such as a drinking water or wastewater stream being treated with ozone. The method comprises contacting the water stream with magnesium thiosulfate under conditions sufficient to quench ozone from the stream.

In another aspect of the invention, a method of scrubbing ozone from a gaseous stream comprises contacting the gaseous stream with magnesium thiosulfate under conditions sufficient for scrubbing ozone from the gaseous stream.

In an alternative embodiment of the invention, chlorine is quenched from a water stream, such as a drinking water or wastewater stream being treated with chlorine, by contacting the stream with magnesium thiosulfate or potassium thiosulfate under conditions sufficient to quench chlorine from the stream.

In another aspect of the invention, a method of scrubbing chlorine from a gaseous stream comprises contacting the gaseous stream with magnesium thiosulfate or potassium thiosulfate under conditions suitable for scrubbing chlorine from the gaseous stream.

In an alternative embodiment of the invention, an air filter comprises an amount of a thiosulfate effective for scrubbing ozone or chlorine from as gaseous stream. The thiosulfate may be, for example, magnesium thiosulfate, calcium thiosulfate, potassium thiosulfate, or sodium thiosulfate.

The use of magnesium thiosulfate can avoid undesirable scaling and sulfate deposits, such as those which can result from precipitation of calcium salts when calcium thiosulfate is used for quenching. The use of magnesium thiosulfate instead results in the introduction of more soluble magnesium salts.

BRIEF DESCRIPTION OF THE DRAWINGS

The present invention will now be described in more detail reference to preferred embodiments of the invention, given only by way of example, and illustrated in the accompanying drawing in which.

DETAILED DESCRIPTION OF THE INVENTION

While not wanting to be bound by theory, it is believed that the application of magnesium thiosulfate quenches ozone, e.g., in drinking water or wastewater being treated with ozone, according to the following reaction pathways:

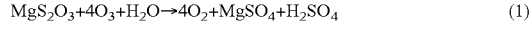
$$MgS_2O_3 + 4O_3 + H_2O \rightarrow 4O_2 + MgSO_4 + H_2SO_4 \quad (1)$$

Since thiosulfate readily oxidizes, if excess thiosulfate is used, the overall reaction pathway is:

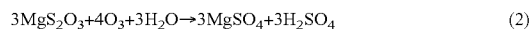
$$3MgS_2O_3 + 4O_3 + 3H_2O \rightarrow 3MgSO_4 + 3H_2SO_4 \quad (2)$$

In a strong basic medium, the following reaction pathway follows:

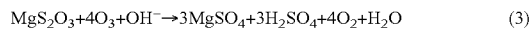
$$MgS_2O_3 + 4O_3 + OH^- \rightarrow 3MgSO_4 + 3H_2SO_4 + 4O_2 + H_2O \quad (3)$$

As in the reaction involving calcium thiosulfate, the theoretical mole ratio of magnesium thiosulfate to ozone is 1:4. The concentration of residual ozone in the water typically is about 2 mg/L or less. An excess of magnesium thiosulfate preferably is used to increase its availability for the reaction. Preferably, magnesium thiosulfate is added at an ozone-to-magnesium thiosulfate ratio less than about 4:1, usually from about 1.5:1 to about 3.5:1, and more usually from about 2:1 to about 2.5:1.

When calcium thiosulfate is used in chlorine quenching, calcium sulfate is generated:

$$CaS_2O_3 + 4Cl_2 + H_2O \rightarrow 8HCl + CaSO_4 + H_2SO_4$$

When magnesium thiosulfate is used for chlorine quenching, magnesium sulfate is produced:

$$MgS_2O_3 + 4Cl_2 + H_2O \rightarrow 8HCl + MgSO_4 + H_2SO_4 \quad (4)$$

Preferably, magnesium thiosulfate is added at a chlorine-to-magnesium thiosulfate ratio less than about 4:1, usually from about 1.5:1 to about 3.5:1, and more usually from about 2:1 to about 2.5:1.

When magnesium thiosulfate is used for ozone or chlorine quenching, as depicted in reactions 1-4, magnesium sulfate is produced. A principal advantage of the use of magnesium thiosulfate over calcium thiosulfate is the higher water solubility of the resulting sulfate salt. In particular, magnesium sulfate has much higher water solubility (about 26.5 g/100 ml) than that of calcium sulfate (about 0.3 g/100 ml), which is produced when calcium thiosulfate is used for ozone or chlorine quenching as illustrated above. Due to its significantly higher water solubility, there is substantially less probability of magnesium sulfate precipitating in treatment facilities or pipelines.

The performance of magnesium thiosulfate as an ozone quencher was evaluated in a laboratory scale both using de-ionized water and city water to compare the ozone demand in these two water samples. In addition, ozone quenching efficiency of magnesium thiosulfate was compared to that of sodium thiosulfate and calcium thiosulfate.

Bench Scale Setup for Ozone Quenching by Thiosulfates

Figure 1:
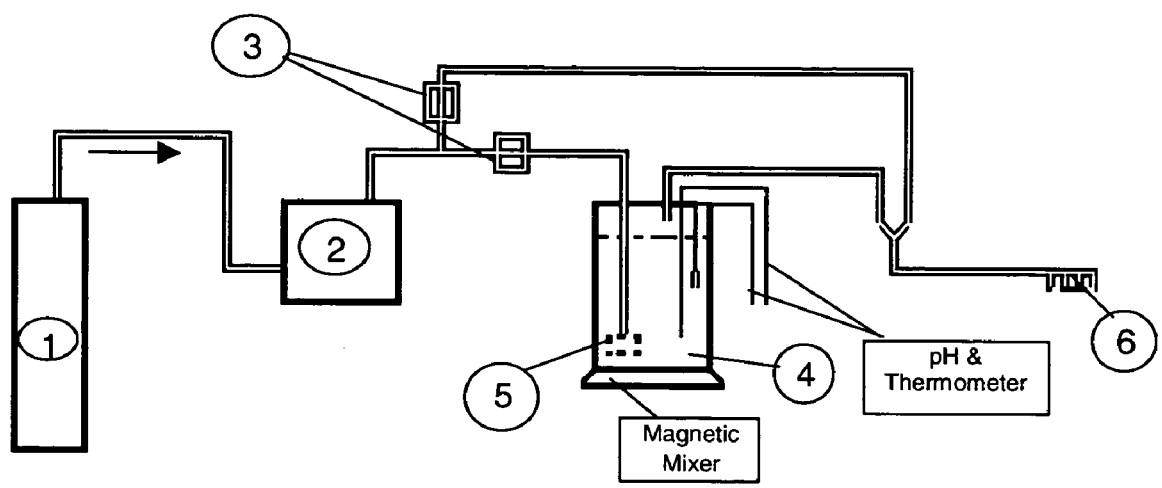
FIG. 1 is a schematic illustration of a reaction vessel used to generate ozonated water in accordance with one embodiment of the invention.

The experimental setup illustrated in FIG. 1 includes an oxygen or air tank (1) that is connected to the CD10 ozone generator (2). Oxygen and ozone ($O_2$—$O_3$) flow from the ozone generator is regulated by flow meters (3) and then are introduced to the treatment vessel (4) by the means of sparger (5). Excess $O_3$ in $O_2$—$O_3$ from the bypass and from the treatment tank off gas is decomposed by thiosulfate (6).

Generation, Injection, and Analysis of Ozone in Water

A setup as shown in FIG. 1 can be used to ozonate water as follows: oxygen from an oxygen tank (1) is passed through an ozone generator (2) to produce ozone (Equation 1). The flow rate is controlled by valve and flow meter (3). A known flow of $O_2$—$O_3$ from ozone generator is introduced into one liter of solution in a treatment vessel (4) through a sparger (5). The $O_2$—$O_3$ bypass and off gas from the treatment vessel are combined and passed through an ozone decomposer, such as a solution of calcium thiosulfate.

$$3O_2 \rightarrow 2O_3 \quad \text{(Equation 1)}$$

Procedure for Ozone Measurements by Iodometric Method

A setup as illustrated in FIG. 1 can be used to generate and deliver ozone for this method. The concentration of ozone in water can be measured as follow:

Add 1000 ml of 2% KI (20 g/l) solution to a 1 L graduated cylinder. Select the ozone generator power ($O_3$ output)=2 W (select a lower output to generate less ozone) and $O_2$—$O_3$ flow rate=70 ml/min. Add a magnetic bar, set the cylinder on a magnetic stirrer and start mixing. Insert the sparger into the 1000 ml KI cylinder and keep it in the solution for one minute (limit the purging time to 15 to 30 seconds for lower ozone concentration). The concentration of ozone in water would be about 12 mg $O_3$/L. Ozone will liberate $I_2$ from KI solution (Equation 2) and the color of the solution will change to reddish/yellow from colorless solution. Transfer 100 ml of this solution into an Erlenmeyer flask and add 10 drops of 1N $H_2SO_4$ and titrate the solution with 0.005N $Na_2S_2O_3$ (Standard Methods for the Examination of Water and Wastewater, 16th Edition. 1985). Add a few drops of starch solution before the pale yellow color disappears. This will change the color of the solution to blue. Continue with the titration until the solution becomes colorless.

$$2KI + O_3 + H_2O \rightarrow I_2 + O_2 + KOH$$

$$I_2 + 2Na_2S_2O_3 \rightarrow 2NaI + Na_2S_4O_6 \quad \text{(Equation 2)}$$

Calculate the ozone concentration from the equation $$\text{mg } O_3/L = [(V \times M) \times 24{,}000]/\text{ml sample}$$

Where: V=ml sodium thiosulfate used in titration and M=molarity of $Na_2S_2O_3$.

COMPARATIVE EXAMPLE 1

Figure 2:
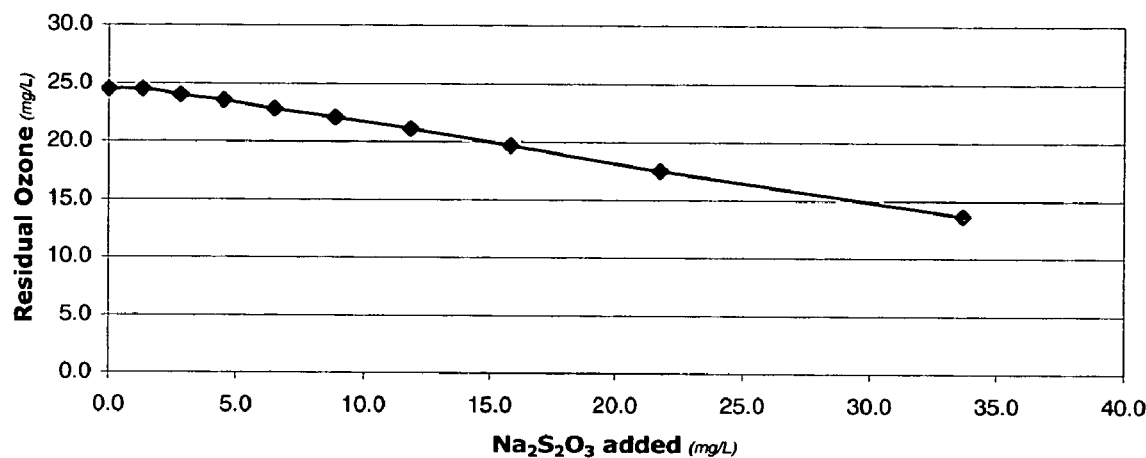
FIG. 2 is a graphical illustration of high concentration ozone quenching by sodium thiosulfate.

This example illustrates ozone quenching using sodium thiosulfate. A procedure was carried out using the following steps: (a) one liter of a solution of 2% KI in DI-water is ozonated as outlined in paragraph [45] above. A 100 ml sample of this water analyzed for dissolved ozone. (b) To the rest of the ozonated water (900 ml) 0.4 ml of 0.02N sodium thiosulfate $Na_2S_2O_3$ is added and mixed for 1 minute. (c) A 100 ml of treated water analyzed for residual ozone. Steps (b) and (C) repeated until there was not enough water (see Table 1). FIG. 2 illustrates the rate of ozone quenching by $Na_2S_2O_3$.

COMPARATIVE EXAMPLE 2

Figure 3:
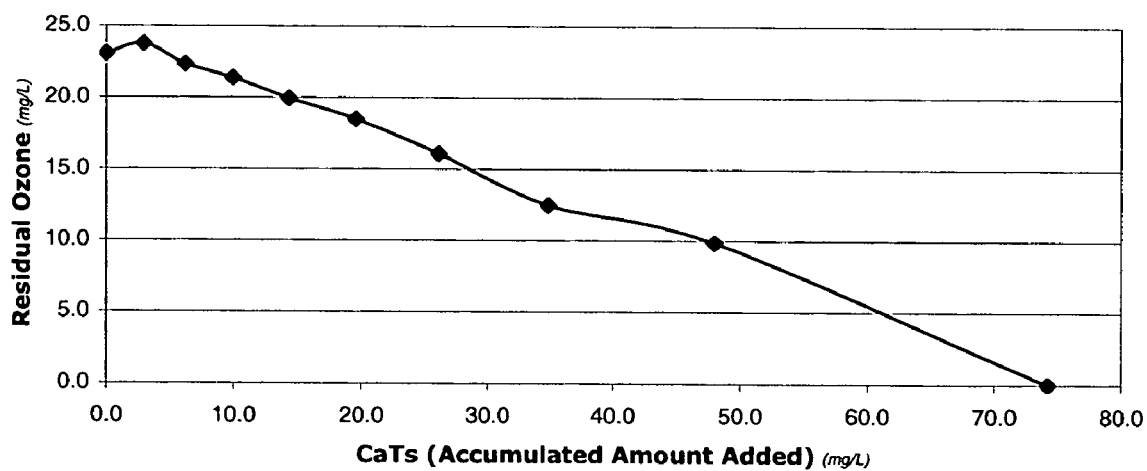
FIG. 3 is a graphical illustration of high concentration ozone quenching by calcium thiosulfate.

This example illustrates ozone quenching using calcium thiosulfate. A procedure was carried out using the following steps: (a) one liter of a solution of 2% KI in DI-Water is ozonated as outlined in paragraph [44] above. A 100 ml sample of this water analyzed for dissolved ozone. (b) To the rest of the ozonated water 1 ml of diluted calcium thiosulfate ($Ca_2S_2O_3$, 1.0930 g/100 ml water) is added and mixed for 1 minute. (c) 100 ml of treated water is analyzed for residual ozone. These steps were repeated until there was not enough water (see Table 1). FIG. 3 illustrates the rate of ozone quenching by calcium thiosulfate.

TABLE 1

| Comparative Example 1 | | Comparative Example 2 | |
|---|---|---|---|
| Accumulated sodium thiosulfate (mg/L) | Residual Ozone (mg/L) | Accumulated calcium thiosulfate (mg/L) | Residual Ozone (mg/L) |
| 0.0 | 24.5 | 0.0 | 23.0 |
| 1.3 | 24.5 | 2.9 | 23.8 |
| 2.8 | 24.0 | 6.2 | 22.3 |
| 4.5 | 23.5 | 9.9 | 21.4 |
| 6.5 | 22.8 | 14.3 | 19.9 |
| 8.9 | 22.1 | 19.6 | 18.5 |
| 11.9 | 21.1 | 26.1 | 16.1 |
| 15.8 | 19.7 | 34.9 | 12.5 |
| 21.8 | 17.5 | 48.0 | 9.8 |
| 33.7 | 13.7 | 74.2 | 0.0 |

Figure 4:
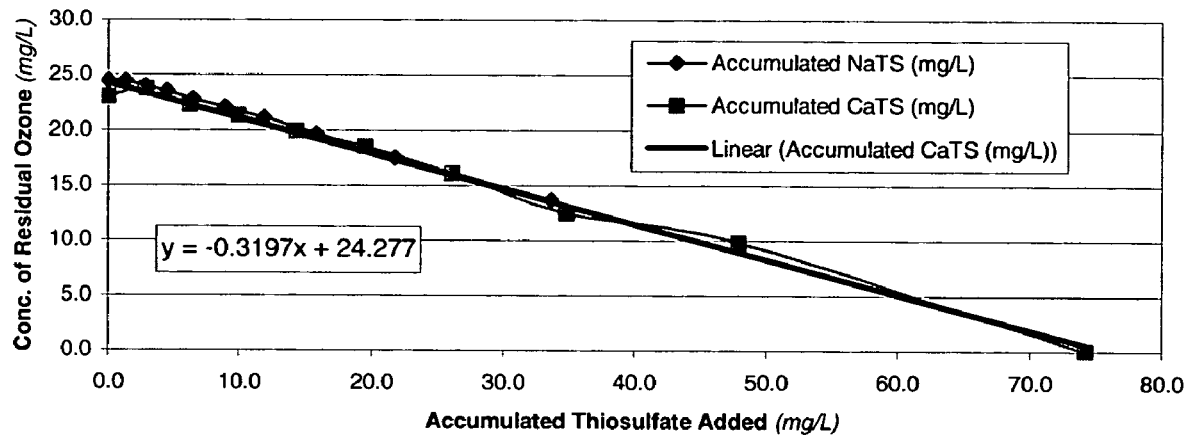
FIG. 4 is a graphical illustration comparing ozone quenching by sodium thiosulfate and calcium thiosulfate.

As shown in FIG. 4, the rate of high concentration ozone quenching by sodium thiosulfate or calcium thiosulfate follows the Equation 3:

$$Y = -0.3197X + 24.277 \quad \text{(Equation 3)}$$

where Y is the concentration of residual ozone (mg/L) and X is the accumulated amount of thiosulfate (mg/L).

The more selective method is the Indigo method, which is explained below.

Procedure for Ozone Measurements by Indigo Method

A setup as described in illustrated in FIG. 1 can be used to generate and deliver ozone to the solution in the vessel for this method.

Figure 5:
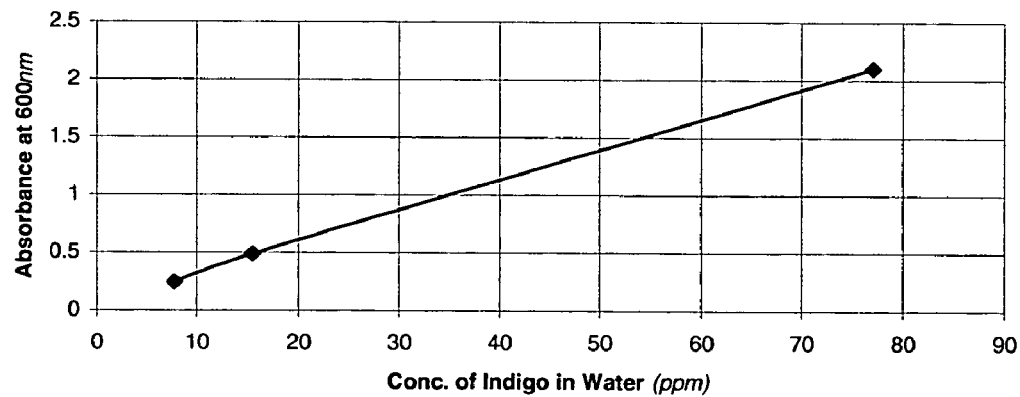
FIG. 5 is a graphical illustration of absorbance vs. concentration for indigo at 600 nm.

The indigo calorimetric method is more selective than iodometric method and particularly is a more suitable method to measure ozone at low concentrations. In this method, ozone rapidly decolorizes indigo in acidic solution. The absorbance is measured at 600 nm and the decrease in absorbance is linear with increasing concentration (as illustrated in FIG. 5). If ozone is measured in less than 6 h after adding reagent interferences are negligible. Minimum detection limit is about 2 to 10 µg/L. In this study, concentrations lower than 10 µg/L are reported as <0.01 mg/L.

Reagents

"Indigo Colorimetric Method # 4500-$O_3$ B" from "Standard Methods for the Examination of Water and Wastewater, $18^{th}$ Edition, 1992" can be used to measure the low concentration of ozone in water.

Indigo reagent I can be prepared by adding 20 ml indigo stock solution to a 1 liter volumetric flask, plus 10 g sodium dihydrogen phosphate ($NaH_2PO_4$) and 7 ml concentrated phosphoric acid. Dilute to mark. At 600 nm, absorbance for this reagent is 0.4857. Prepare fresh reagent when its absorbance decreases to less than about 80% of its initial value (typically within a week).

Indigo reagent II can be prepared as described for indigo reagent I, except add 100 ml indigo stock solution instead of 20 ml. At 600 nm absorbance for this solution is 2.1008.

Malonic acid reagent can be prepared by dissolving 5 g malonic acid in water and diluting to 100 ml.

Glycine reagent can be prepared by dissolving 7 g glycine in water and diluting to 100 ml.

Spectrophotometric Procedure

Ozone concentration range of 0.01 to 0.1 mg $O_3$/L: add 10 ml indigo reagent I to two 100-ml volumetric flasks. Fill one flask to mark with DI-water (Blank). Fill other flask to mark with sample. Add sample so that completely decolorized the solution (normally 90 ml). Measure absorbance of both solutions at 600±5 nm. Calculate ozone concentration from Equation 4:

$$\text{mg } O_3/L = (100 \times \Delta A)/(f \times b \times V) \quad \text{(Equation 4)}$$

Where: $\Delta A$=difference in absorbance between sample and blank, b=path length of cell, (1 cm), V=volume of sample, ml, (normally 90 ml), and f=0.42.

Ozone concentration range of 0.05 to 0.5 mg $O_3$/L: proceed as above using 10 ml indigo reagent II instead of reagent I.

For ozone concentrations greater than 0.3 mg $O_3$/L, can proceed using indigo reagent II, but for these higher ozone concentration use smaller sample volume. Dilute resulting mixture to 100 ml with DI-water. Transfer sample with glass pipette.

Ozone Quenching by Magnesium Thiosulfate

The concentration of excess ozone in water in treatment plant typically is about 1 mg/L.

The following study shows ozone quenching at a concentration of about 1 mg/L. In this study, the Indigo Colorimetric Method (Method # 4500-$O_3$ B from Standard Methods $18^{th}$ edition) can be used to measure residual ozone in water.

The setup shown in FIG. 1 can be employed to generate and deliver ozone to the solution in the vessel. The output power of ozone generator is set to 1 (minimum) and $O_2$—$O_3$ flow rate to 40-50 ml/min. Under these conditions, one liter of DI-water is ozonated for 20 seconds and the concentration of ozone in water is measured by (Reagent II) and from Equation 4. Following the procedure described above, the concentration of ozone in water was measured and found to be an average of about 0.64 mg/L, as recorded in Table 2.

TABLE 2

Concentration of dissolved ozone in water measured by Indigo Method

| Vol. of Reagent (ml) | Vol. of Sample (ml) | Water Added (ml) | Total Volume (ml) | Absorbance | mg $O_3$/L |
|---|---|---|---|---|---|
| 10 | 50 | 40 | 100 | 0.134 | 0.64 |
| 10 | 25 | 65 | 100 | 0.068 | 0.65 |
| | | Average | | | 0.64 ± 0.02 |

Diluted solution of magnesium thiosulfate: magnesium thiosulfate at a concentration of 1.07 mg/L in water can be prepared by diluting 1 ml of 21.64% magnesium thiosulfate (d=1.2358 g/ml) in 250 ml of water. This solution was used as a quenching agent in tests where magnesium thiosulfate was added. (Molecular weight of 136 is used for magnesium thiosulfate for all calculations.)

Figure 6:
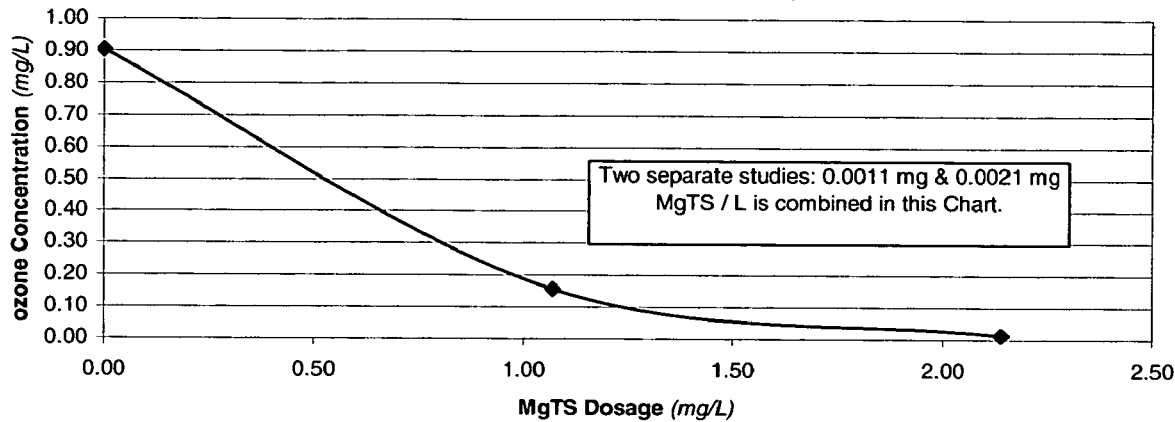
FIG. 6 is a graphical illustration of low concentration ozone quenching by magnesium thiosulfate in accordance with one embodiment of the invention.

In a preliminary study, 1 ml (1.07 mg/L) of magnesium thiosulfate was added in two intervals to ozonated DI-water, and the concentration of ozone was measured at each interval as recorded in Table 3 and shown in FIG. 6.

TABLE 3

Preliminary Study on Ozone Quenching of DI-Water by Magnesium Thiosulfate

| Time (min.) | Wt. of MgTS added at each Interval (mg/L) | Mole Ratio of $O_3$/MgTS | Concentration of $O_3$ (mg/L) |
|---|---|---|---|
| 0 | 0 | — | 0.90 |
| 1 | 1.07 | 0.0188/0.008 = 2.35 | 0.16 |
| 2 | 1.07 (total added 2 × 1.07 = 2.14) | — | <0.01 |

EXAMPLES 1-4

Figure 7:
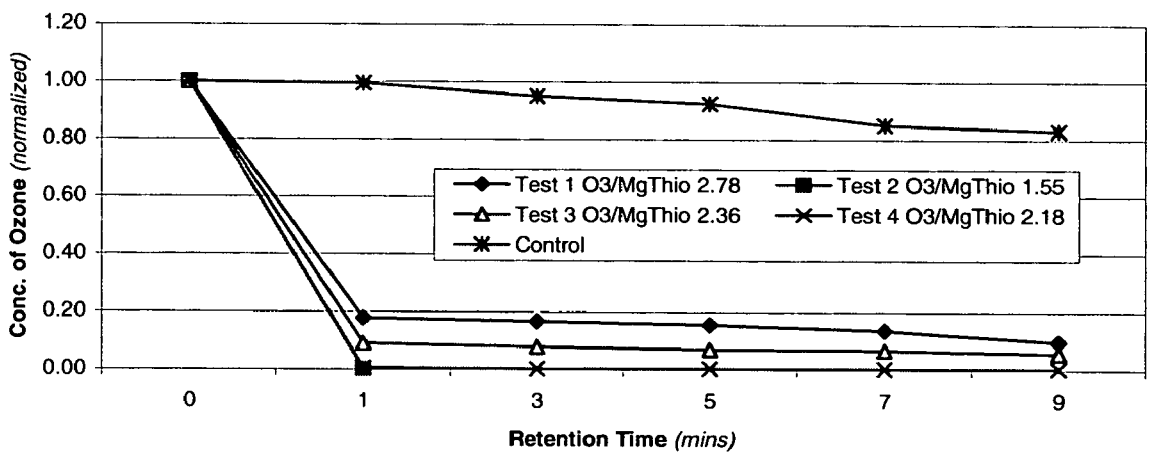
FIG. 7 is a graphical illustration of low concentration ozone quenching in de-ionized water by magnesium thiosulfate normalized and at various magnesium thiosulfate/$O_3$ mole ratios.

Based on the above preliminary study, magnesium thiosulfate at an ozone/magnesium thiosulfate mole ratio of 2.4:1 was found to reduce the concentration of dissolved ozone in DI-water more than ten-fold (from about 1 mg/L to less than 0.01 mg/L) in about 2 minutes. Another set of ozone quenching tests using magnesium thiosulfate on ozonated DI-water was performed and the related data are tabulated in Table 4 and illustrated in FIG. 7.

TABLE 4

Quenching Ozone in De-Ionized Water by Magnesium Thiosulfate

| Example | Magnesium thiosulfate Added (mg/L) | Mole Ratio O₃/Magnesium thiosulfate | Concentration of O₃ (mg/L) at time intervals (mins) - 0 | 1' | 3' | 5' | 7' | 9' |
|---|---|---|---|---|---|---|---|---|
| 1 | 0 | | 1.10 | — | — | — | — | — |
|   | 1.13 | 2.78 | — | 0.20 | 0.19 | 0.17 | 0.15 | 0.11 |
| 2 | 0 | | 1.23 | — | — | — | — | — |
|   | 2.24 | 1.55 | — | <0.01 | — | — | — | — |
| 3 | 0 | | 1.21 | — | — | — | — | — |
|   | 1.46 | 2.36 | — | 0.11 | 0.10 | 0.09 | 0.08 | 0.07 |
| 4 | 0 | | 1.21 | — | — | — | — | — |
|   | 1.57 | 2.18 | — | 0.01 | <0.01 | <0.01 | <0.01 | <0.01 |
| Control | 0 | | 1.05 | — | — | — | — | — |
|   | 0 | 0 | — | 1.04 | 1.00 | 0.97 | 0.89 | 0.87 |

To identify the proper dosage of magnesium thiosulfate for ozone quenching, several mole ratios of ozone to magnesium thiosulfate ($O_3$/MgTS) were examined. Example 1 used the highest ratio of $O_3$/MgTS of 2.78, corresponding to the lowest concentration of MgTS. At this ratio, the concentration of residual ozone dropped from 1.1 to 0.2 mg/L (almost 5-fold) in 1 minute and after that to 0.11 mg/L after 9 minutes. Example 2 had the lowest ratio of ($O_3$/MgTS) of 1.55, corresponding to the highest concentration of MgTS. At this ratio, the concentration of residual ozone dropped from 1.23 mg/L to undetectable (<0.01 mg/L) in 1 minute. Examples 3 and 4 used slightly different ratios of $O_3$/MgTS. These latter two examples illustrate that $O_3$/MgTS mole ratios of 2.2 or lower are the most suitable ratios in order to reduce the concentration of ozone in water to non-detectable in about 1 minute. The last entry of Table 4 is a control run, in which no MgTS was added, to show the loss of ozone versus time.

EXAMPLES 5-6

Figure 8:
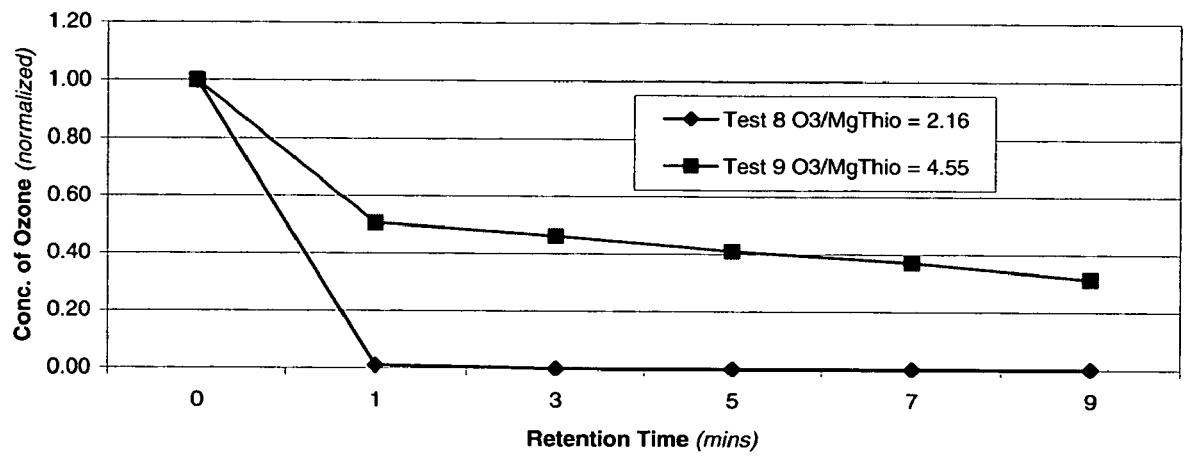
FIG. 8 is a graphical illustration of low concentration quenching ozone in city water by magnesium thiosulfate normalized and at two ozone/magnesium thiosulfate mole ratios.

Examples 5 and 6 illustrate quenching ozone in city water. It was found that to reach to a dissolved ozone concentration of 0.01 mg/L or lower in 1 minute, the $O_3$/MgTS molar ratio should be about 2.2 or lower (see FIG. 8). Note this same ratio was found in the previous study with DI-water.

TABLE 5

Quenching Ozone in City Water by Magnesium Thiosulfate

| Example | Magnesium thiosulfate Added (mg/L) | Mole Ratio O₃/Magnesium thiosulfate | Concentration of O₃ (mg/L) at time intervals (min.) 0 | 1' | 3' | 5' | 7' | 9' |
|---|---|---|---|---|---|---|---|---|
| 5 | 0 | | 1.07 | — | — | — | — | — |
|   | 1.41 | 2.2 | — | 0.01 | — | — | — | — |
| 6 | 0 | | 1.13 | — | — | — | — | — |
|   | 0.71 | 4.6 | — | 0.57 | 0.52 | 0.46 | 0.42 | 0.36 |

Precision and bias: in the absence of interferences, the relative error generally is less than about 5% without any special sampling setup. With better sampling skills, the error may be reduced to about 1% or lower. Because this method is based on the differences in absorbance between sample and blank ($\Delta A$), the method is not applicable in the presence of chlorine. If the magnesium content exceeds that of ozone, precision is reduced. If the ratio of magnesium to ozone is less than about 10:1, ozone concentrations above about 0.02 mg/L may be determined with relative error of less than about 20%.

Control interferences: see Colorimetric Method (Method # 4500-$O_3$ B from Standard Methods 18$^{th}$ edition).

Chlorine Quenching by Magnesium Thiosulfate

The concentration of residual chlorine in water in treatment plants typically is about 1-2 mg/L. In this study, the DPD (N,N-diethyl-1,4-phenylenediamine) Colorimetric Method adapted from Standard Method (Method # 408 E from Standard Methods for the Examination of Water and Wastewater 16$^{th}$ edition) was used to measure residual chlorine in water.

Summary of DPD Method: chlorine in the sample as hypochlorous acid or hypochlorite ion (free chlorine or free available chlorine) immediately reacts with DPD indicator to form a red (magenta) color which is proportional to the chlorine concentration:

$Cl_2 + H_2O \rightarrow H^+ + Cl^- + HOCl$ (Hypochlorous Acid)

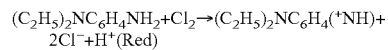
$(C_2H_5)_2NC_6H_4NH_2 + Cl_2 \rightarrow (C_2H_5)_2NC_6H_4(^+NH) + 2Cl^- + H^+$ (Red)

Calibration of colorimeter: the colorimeter was calibrated with chlorine standard. A 1000 mg/L of chlorine solution is prepared from a 6% household hypochlorite solution. Diluted concentration of chlorine solution in water was prepared from this solution. The chlorine solution in water is prepared fresh daily.

Calibration curve: commercial bleach is a solution of sodium hypochlorite in water:

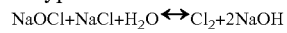
$NaOCl + NaCl + H_2O \leftrightarrow Cl_2 + 2NaOH$

Figure 9:
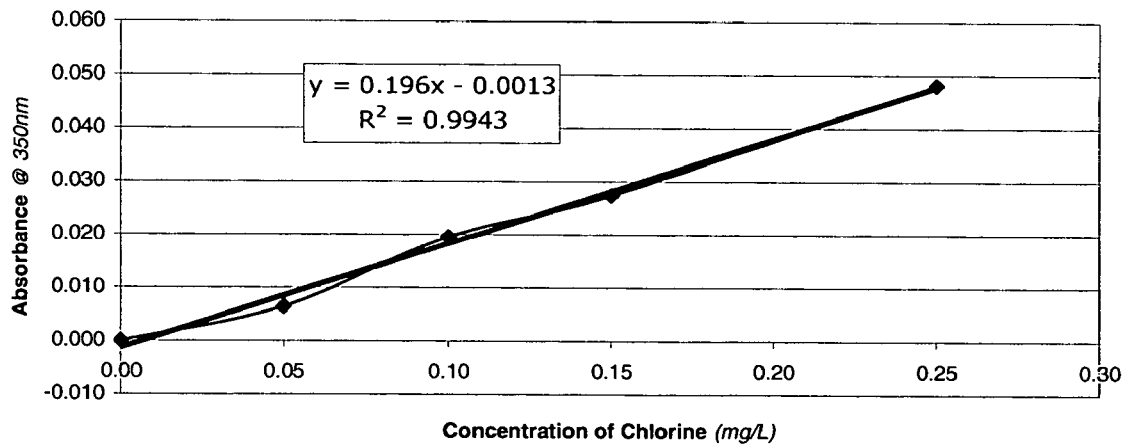
FIG. 9 is a graphical determination of chlorine in water by N,N-diethyl-1,4-phenylenediamine (DPD)

In this study, a solution of 6% commercial bleach was used. The density of this solution at 25° C. is 1.093 g/mL. A primary standard solution of about 1000 mg/L of chlorine in water was prepared by adding 1.59 ml of the stock solution into 100 ml of water. A secondary standard solution of chlorine in the range of 0.05 to 0.31 mg/L was prepared from the primary standard solution. After developing the color by adding DPD to 10 ml of each standard, the absorbance at 530 nm were measured and recorded in Table 6. The equation for the standard curve shown in FIG. 9 is:

$$Y = 0.196X + 0.0013 \quad \text{(Equation 5)}$$

where Y is the absorbance and X is the concentration of chlorine in water in mg/L. This equation is used in following studies to calculate the concentration of chlorine in water.

TABLE 6

Relation Between Absorbance (530 nm) Chlorine Concentration

| Concentration of $Cl_2$ (mg/L) | Absorbance |
|---|---|
| Blank | 0.0000 |
| 0.05 | 0.0064 |
| 0.10 | 0.0195 |
| 0.15 | 0.0274 |
| 0.25 | 0.0481 |

Two different containers and two different concentration of chlorine in water (5 and 3 mg/L) were used in this study. For 5 mg/L a one-liter graduated cylinder was used, and for 3 mg/L an Erlenmeyer flask was used. In both cases tap water was chlorinated and mixed at least for a period of time and analyzed several times for chlorine before the addition of magnesium thiosulfate. The purpose of this extra step was to eliminate the chlorine demand factor of tap water before the addition of magnesium thiosulfate. All samples of chlorine in water were analyzed by DPD Method adapted from Standard Methods for the Examination of Water and Wastewater, 16$^{th}$ Edition.

EXAMPLE 7

Figure 10:
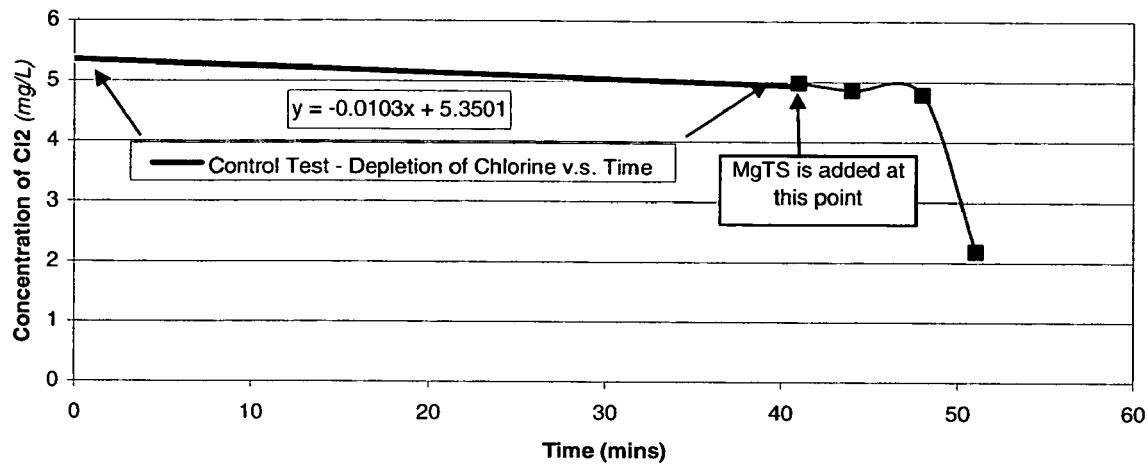
FIG. 10 is a graphical illustration of quenching residual chlorine in tap water at 5 mg/L concentration by magnesium thiosulfate.

Quenching chlorine in water at 5 mg/L concentration: tap water was spiked in a one-liter graduated cylinder with 5 ml of 1,000 mg/L of chlorine at water temperature of 33° C. The test continued in two segments. The first segment was the control test. In this part, which lasted 41 minutes, several samples were analyzed for residual chlorine. The first sample was analyzed after 8 minutes from the time that chlorine was added. Table 7 contains data related to this test. After the first part (41 minutes) the test continued and second segment of the test started. In this second part, 1.35 ml of diluted (1.07 mg/L) magnesium thiosulfate was added to the rest of the solution and mixing continued. The concentration of chlorine in water at each interval is calculated from the Equation 5 and is illustrated in FIG. 10. As illustrated in FIG. 10, depletion of chlorine in tap water, while mixing, at the initial concentration of 5 mg/L follows the equation $$Y = -0.0103X + 5.3501$$

where Y is the concentration of chlorine in mg/L and X is the time in minutes. For example, after 30 minutes of mixing, the concentration of residual chlorine in water was reduced about 7%, i.e., from 5.4 mg/L to 5.0 mg/L.

TABLE 7

Quenching Chlorine at Concentration of 5 mg/L in Water by Magnesium Thiosulfate

| Time Intervals (minutes) | Concentration of Chlorine (mg/L) (Adjusted for dilution) | Mole Ratio of $Cl_2$/ Magnesium thiosulfate |
|---|---|---|
| 0 | — | — |
| 8 | 4.90 | — |
| 12 | 5.46 | — |
| 19 | 5.34 | — |
| 24 | 5.04 | — |
| 36 | 4.56 | — |
| 41 | 4.98 | — |
| *44 | 4.86 | 6.2 |
| 48 | 4.78 | — |
| 51 | 2.18 | — |

*1.5 g MgTS was added after 41 minutes

EXAMPLE 8

Figure 11:
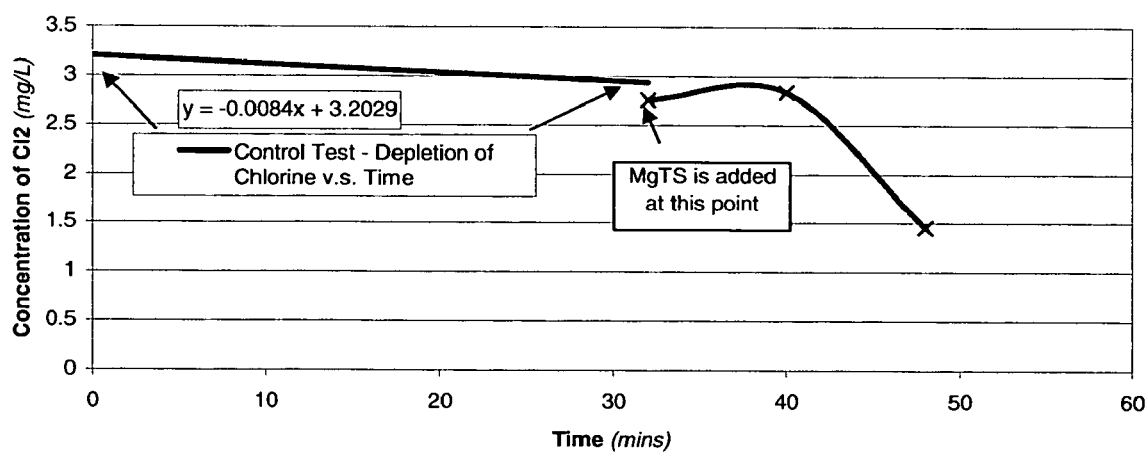
FIG. 11 is a graphical illustration of quenching residual chlorine in tap water at 3 mg/L concentration by magnesium thiosulfate.

Quenching chlorine in water at 3 mg/L concentration: tap water was spiked in a one-liter Erlenmeyer flask with 3 ml of 1,000 mg/L of chlorine at a water temperature of 26° C. The test continued in two segments. The first segment was the control test. In this first part, which lasted 40 minutes, several samples were analyzed for residual chlorine. The first sample was analyzed after 8 minutes from the time that chlorine was added. Table 8 contains data related to this test. After the first part, the test continued and the second segment of the test started. In this second part, 1.35 ml of diluted (1.07 mg/L) magnesium thiosulfate was added to the rest of the solution and mixing continued. The concentration of chlorine in water at each interval was calculated from Equation 5 and is illustrated in FIG. 11. As illustrated in FIG. 11, depletion of chlorine in tap water, while mixing, at the initial concentration of 3 mg/L follows the equation $$Y = -0.0084X + 3.20$$

where Y is the concentration of chlorine in mg/L and X is the time in minutes. For example, after 30 minutes of mixing the concentration of residual chlorine in water was reduced about 7 to 8%, i.e., from about 3.2 mg/L to 2.9 mg/L.

TABLE 8

Quenching Chlorine at Concentration of 3 mg/L in Tap Water by MgTS

| Time Interval (minutes) | Concentration of Chlorine (mg/L) (Adjusted for dilution) | Mole Ratio $Cl_2$/Magnesium thiosulfate |
|---|---|---|
| 0 | Spiked with $Cl_2$ | — |
| 8 | 3.01 | — |
| 16 | 3.14 | — |
| 24 | 3.24 | — |
| 32 | 2.76 | — |
| *40 | 2.84 | 3.6 |
| 48 | 1.45 | — |

*1.5 g MgTS was added after 32 minutes

Potassium thiosulfate also was found to be effective as a chlorine quenching agent. A one-liter sample of chlorinated water (1 mg/L) was treated with a diluted solution 1.2% (w/w) of potassium thiosulfate in water and the concentration of chlorine was measured by DPD colorimetric method to be less than 0.1 ppm in about 30 seconds.

Figure 12:
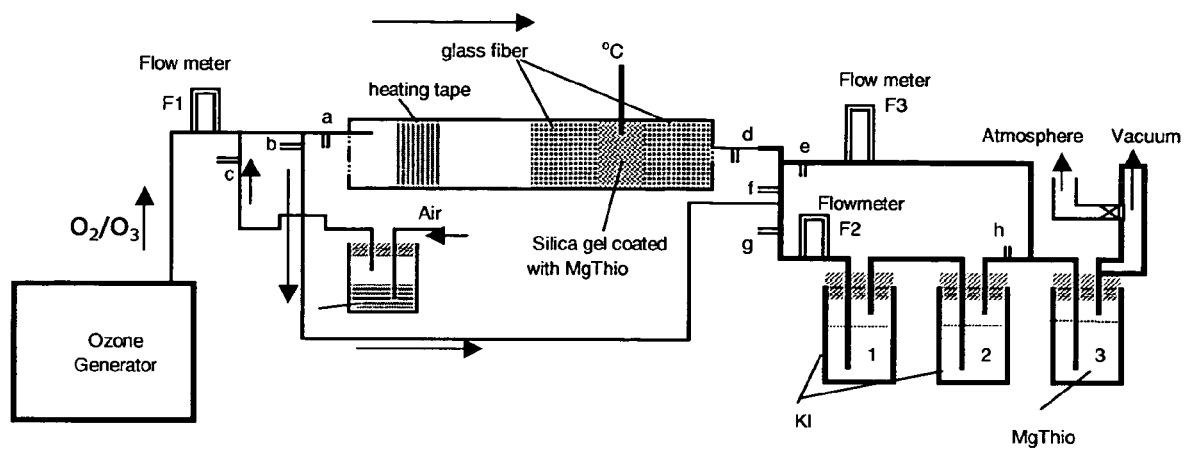
FIG. 12 is a schematic illustration of an apparatus having a filter containing magnesium thiosulfate for scrubbing ozone or chlorine from a gaseous stream in accordance with an alternative embodiment of the invention.

FIG. 12 illustrates an alternative embodiment of the invention in which a filter containing a thiosulfate is used for scrubbing ozone or chlorine from a gaseous stream. The thiosulfate may be, for example, magnesium thiosulfate, calcium thiosulfate, potassium thiosulfate, or sodium thiosulfate. The filter can be prepared, for example, by spraying magnesium thiosulfate on surface of silica gel granules, drying the granules overnight, and then packing the granules in a column supported on both sides by glass fiber, as illustrated in FIG. 12. The $O_2/O_3$ flow passes through the pact coated-silica gel. About 10 g of 22% (w/w) magnesium thiosulfate (equivalent to about 2.2 g pure magnesium thiosulfate) was found to be effective for destroying 160 mg $O_3$ at 40° C. (104° F.) and 100% RH. This is equivalent to a magnesium thiosulfate-to-ozone mole ratio of about 5:1.

As illustrated in FIG. 12, an air/ozone stream from an ozone generator can be mixed with humid air at point "c" (e.g., simulating an off-gas from wastewater treatment plant) and either enters the catalyst at point "a" or bypasses the reactor through point "b." The effluent "d" either enters the atmosphere/vacuum after passing through the scrubber 3 via line "e" or enters KI traps 1 and 2 (via lines "f" and "g") to measure the concentration of ozone in the air stream before passing through the scrubber 3 via line "h." F1, F2, and F3 are flow meters measuring the flowrate from the ozone generator, to the KI traps 1 and 2, and the remainder of the flow, respectively. A probe (not shown) inserted into the catalyst bed measures the temperature of the bed and a heating tape installed at the entrance controls the temperature in the reactor to prevent water condensation. Table 9 shows the specifications of the support, magnesium thiosulfate, and catalyst bed. Table 10 shows the specifications and ratio of air/ozone to magnesium thiosulfate.

TABLE 9

| | | | | | | | | | |
|---|---|---|---|---|---|---|---|---|---|
| Silica Gel As Support + Magnesium Thiosulfate 21.6% as Catalyst | | | | | | | | | |
| Raw Materials | | Data for Catalyst on Support | | | | Catalyst + Support inside the Glass Cylinder | | | |
| Wt.* of dried Support (g) | Wt. of MgTS Added (g) | Wt. of Coated Dried Support (g) | Wt. of Catalyst on Dried Support (g) | Volume of Coated Dried Support (ml) | Bulk Density g/ml | ID of Bed (cm) | Average Height of the Bed (cm) | Bed Volume ($\pi r^2 h$) (ml) | Bed Cross-Sectional Area ($\pi r^2$) ($cm^2$) |
| 36.7 | 11.0 | 46.7 | 10.0 | 50.2 | 0.930 | 3.7 | 4.8 | 51.3 | 10.7 |

*Volume of dried support = 50.2 ml bulk density un-coated = 0.73 g/ml
**GHSV = Gas Hourly Space Velocity
***Residence Time (sec) (empty bed contact time) = (3600 sec/hr)/(GHSV ($hr^{-1}$))

TABLE 10

| | | | | | | | | | |
|---|---|---|---|---|---|---|---|---|---|
| Influent Gas ($O_2/O_3$) @ 100% Relative Humidity (R.H.) | | | | | | | | | |
| $O_2/O_3$ Flow Rate ml/min | Linear Velocity (cm/sec) | GHSP* ($hr^{-1}$) | Residence Time** (sec) | Wt. of Ozone in Influent Gas (mg/min) | Total Wt. of Ozone passes through Catalyst (mg) | # of Moles of Ozone Passed through Catalyst | Total Wt. of MgTS Coated on silica gel (mg) | # of Moles of MgTs | Mole ratio of MgTS to Ozone |
| 1980 | 3.1 | 2315 | 1.6 | 3.2 | 160 | 3 | 2200 | 16 | 5 |

*GHSV = Gas Hourly Space Velocity
**Residence Time (sec) (empty bed contact time) = (3600 sec/hr)/(GHSV ($hr^{-1}$))

It will be understood that while the invention has been described in conjunction with specific embodiments thereof, the foregoing description and examples are intended to illustrate, but not limit the scope of the invention. Other aspects, advantages and modifications will be apparent to those skilled in the art to which the invention pertains, and these aspects and modifications are within the scope of the invention, which is limited only by the appended claims.

What is claimed is:

1. A method of quenching ozone from a water stream containing ozone comprising contacting the water stream with magnesium thiosulfate under conditions sufficient to quench ozone from the water stream.

2. The method of claim 1 wherein the water stream comprises drinking water.

3. The method of claim 1 wherein the water stream comprises wastewater.

4. The method of claim 1 wherein magnesium thiosulfate is contacted with the water stream at an ozone to magnesium thiosulfate mole ratio of from about 1.5:1 to about 3.5:1.

5. The method of claim 4 wherein the ozone to magnesium thiosulfate mole ratio is from about 2:1 to about 2.5:1.

6. A method of scrubbing ozone from a gaseous stream containing ozone comprising contacting the gaseous stream with magnesium thiosulfate under conditions sufficient for scrubbing ozone from the gaseous stream.

7. The method of claim 6 wherein the gaseous stream comprises air and treatment system plant off-gas.

8. The method of claim 6 wherein magnesium thiosulfate is contacted with the gaseous stream at an ozone to magnesium thiosulfate mole ratio of from about 1.5:1 to about 3.5:1.

9. The method of claim 8 wherein the ozone to magnesium thiosulfate mole ratio is from about 2:1 to about 2.5:1.

10. The method of claim 6 wherein the gaseous stream is passed through a filter containing magnesium thiosulfate.

11. The method of claim 7 wherein the gaseous stream is passed through a filter containing magnesium thiosulfate.

12. The method of claim 8 wherein the gaseous stream is passed through a filter containing magnesium thiosulfate.

13. The method of claim 9 wherein the gaseous stream is passed through a filter containing magnesium thiosulfate.

* * * * *